(12) United States Patent
Yung et al.

(10) Patent No.: US 7,730,261 B1
(45) Date of Patent: Jun. 1, 2010

(54) MULTICORE MEMORY MANAGEMENT SYSTEM

(75) Inventors: Geoffrey K. Yung, Belmont, CA (US); Chia-Hung Chien, Sunnyvale, CA (US)

(73) Assignee: Marvell International Ltd. (BM)

( * ) Notice: Subject to any disclaimer, the term of this patent is extended or adjusted under 35 U.S.C. 154(b) by 486 days.

(21) Appl. No.: 11/507,880

(22) Filed: Aug. 21, 2006

Related U.S. Application Data

(60) Provisional application No. 60/752,522, filed on Dec. 20, 2005.

(51) Int. Cl.
*G06F 12/00* (2006.01)
(52) U.S. Cl. .................................. 711/130
(58) Field of Classification Search ............ None
See application file for complete search history.

(56) References Cited

U.S. PATENT DOCUMENTS

| | | | | |
|---|---|---|---|---|
| 4,445,174 A | * | 4/1984 | Fletcher | 711/121 |
| 5,586,270 A | * | 12/1996 | Rotier et al. | 710/301 |
| 6,523,090 B2 | * | 2/2003 | Tremblay | 711/125 |
| 6,725,336 B2 | * | 4/2004 | Cherabuddi | 711/129 |
| 6,976,131 B2 | * | 12/2005 | Pentkovski et al. | 711/146 |
| 2005/0204112 A1 | * | 9/2005 | O'Connor et al. | 711/167 |
| 2006/0004963 A1 | * | 1/2006 | Mattina et al. | 711/130 |

* cited by examiner

*Primary Examiner*—Hiep T Nguyen

(57) ABSTRACT

A multiprocessing system includes, in part, a multitude of processing units each in direct communication with a bus, a multitude of memory units in direct communication with the bus, and at least one shared memory not in direct communication with the bus but directly accessible to the plurality of processing units. The shared memory may be a cache memory that stores instructions and/or data. The shared memory includes a multitude of banks, a first subset of which may store data and a second subset of which may store instructions. A conflict detection block resolves access conflicts to each of the of the banks in accordance with a number of address bits and a predefined arbitration scheme. The conflict detection block provides each of the processing units with sequential access to the banks during consecutive cycles of a clock signal.

26 Claims, 6 Drawing Sheets

MULTICORE MEMORY MANAGEMENT SYSTEM

CROSS-REFERENCES TO RELATED APPLICATIONS

The present application claims benefit under 35 USC 119(e) of U.S. provisional Application No. 60/752,522, filed Dec. 20, 2005, entitled "Multicore Memory Management System" the content of which is incorporated herein by reference in its entirety.

BACKGROUND OF THE INVENTION

The present invention relates generally to electronic devices, and more particularly to memory management systems used in such devices.

In conventional multi-core systems, each core (processing unit) has an associated tightly coupled memory (TCM) that may be a cache memory. FIG. 1 shows a system 50 having two cores 10, 20 as known in the prior art. Core 10 directly communicates with a dedicated data cache 14 and a dedicated instruction cache 12. Core 20 directly communicates with a dedicated data cache 24 and a dedicated instruction cache 22. Because data cache 14 and instruction cache 12 are dedicated to core 10, these two caches are not accessible to core 20. Similarly, because data cache 24 and instruction cache 22 are dedicated to core 20, these two caches are not accessible to core 10. Cores 10 and 20 are typically configured to execute common instructions. Storing such common instructions in both instruction caches 12 and 22 result in inefficiencies. Similarly, cores 10 and 20 may operate on the same data and, therefore, inefficiencies result from having dedicated data caches.

BRIEF SUMMARY OF THE INVENTION

In accordance with one embodiment of the present invention, a multiprocessing system, includes, in part, a multitude of processing units each in direct communication with a bus; a multitude of memory units in direct communication with the bus, and at least one shared memory directly accessible to the plurality of processing units. The shared memory is not in direct communication with the bus. The shared memory may be a cache memory configured to store instructions or data.

In one embodiment, the shared memory includes a multitude of banks each of which is accessible directly by each of the processing units. In such embodiments, a first subset of the banks may be configured to store data and a second subset of the banks may be configured to store instructions. In some embodiments, the number of banks is greater than the number of processing units. Each bank may be a single port or a dual port bank. A first multitude of multiplexers, each associated with a different one of the banks, receive data from the processing units during each clock cycle, and supply one of the received data to their associated banks. A second multitude of multiplexers receive data from the plurality of banks during each clock cycle. Each such multiplexer supplies one of the received data at its output terminal during each clock cycle.

The multiprocessing system further includes a conflict detection block configured to resolve access conflicts to each of the of the banks in accordance with a number of address bits and a predefined arbitration scheme. In some embodiments, the conflict detection block is configured to provide each of the processing units with sequential access to the banks during consecutive cycles of a clock signal.

A method of managing a memory, in accordance with another embodiment of the present invention, includes, in part, using a bus to transfer data directly between at least one system memory and a multitude of processing units; and sharing at least one memory between the multitude of processing units. The shared memory is not in direct communication with the bus. The shared memory may be a cache memory configured to store instructions or data.

Such embodiments further include, in part, partitioning the shared memory into a plurality of banks, transferring data between each of the processing units and each of a first subset of the banks; and transferring instructions between each of the processing units and each of a second subset of the banks. In some embodiments, the number of banks is greater than the number of processing units. Each bank may be a single port or a dual port bank.

Such embodiments further include, in part, selectively supplying data during each clock cycle from each of the processing units to the plurality of banks, and selectively retrieving data during each clock cycle from each of the plurality of banks. Such embodiments further include, resolving conflicts in accessing the banks using a number of address bits and in accordance with a predefined arbitration scheme. Such embodiments further include providing each of the processing units with sequential access to the multitude of banks during consecutive cycles of the clock signal.

A multiprocessing system, in accordance with another embodiment of the present invention, includes means for using a bus to transfer data directly between at least one system memory and a multitude of processing units; and means for sharing at least one memory between the multitude of processing units. The shared memory is not in direct communication with the bus. The shared memory may be a cache memory configured to store instructions or data.

In such embodiments, the shared memory is partitioned into a plurality of banks. The multiprocessing system further includes means for transferring data between each of the processing units and each of a first subset of the banks; means for transferring instructions between each of the processing units and each of a second subset of the banks. In some embodiments, the number of banks is greater than the number of processing units. Each bank may be a single port or a dual port bank.

Such embodiments further include, in part, means for selectively supplying data during each clock cycle from each of the processing units to the plurality of banks, and means for selectively retrieving data during each clock cycle from each of the plurality of banks. Such embodiments further include, means for resolving conflicts in accessing the banks using a number of address bits and in accordance with a predefined arbitration scheme. Such embodiments further include means for providing each of the processing units with sequential access to the multitude of banks during consecutive cycles of the clock signal.

DETAILED DESCRIPTION OF THE INVENTION

Figure 1:
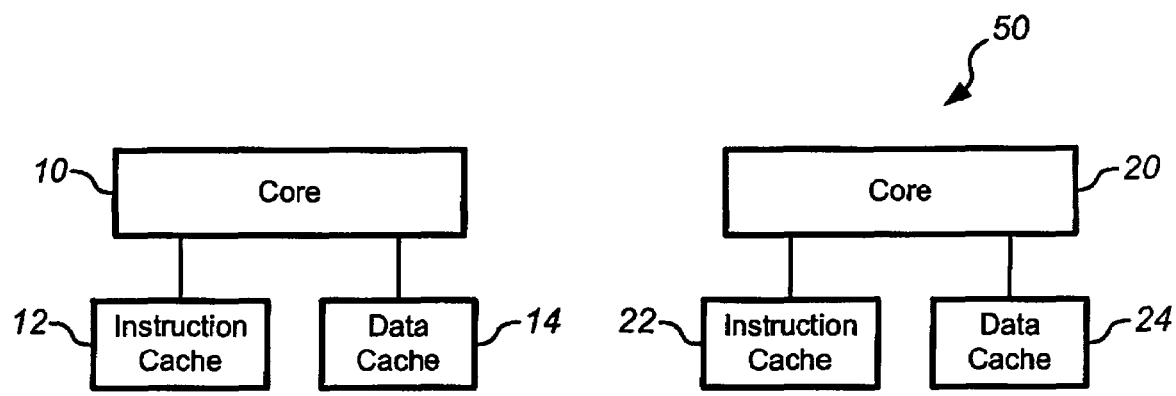
FIG. 1 is a simplified high level block diagram of a multicore system, as known in the prior art.
Figure 2:
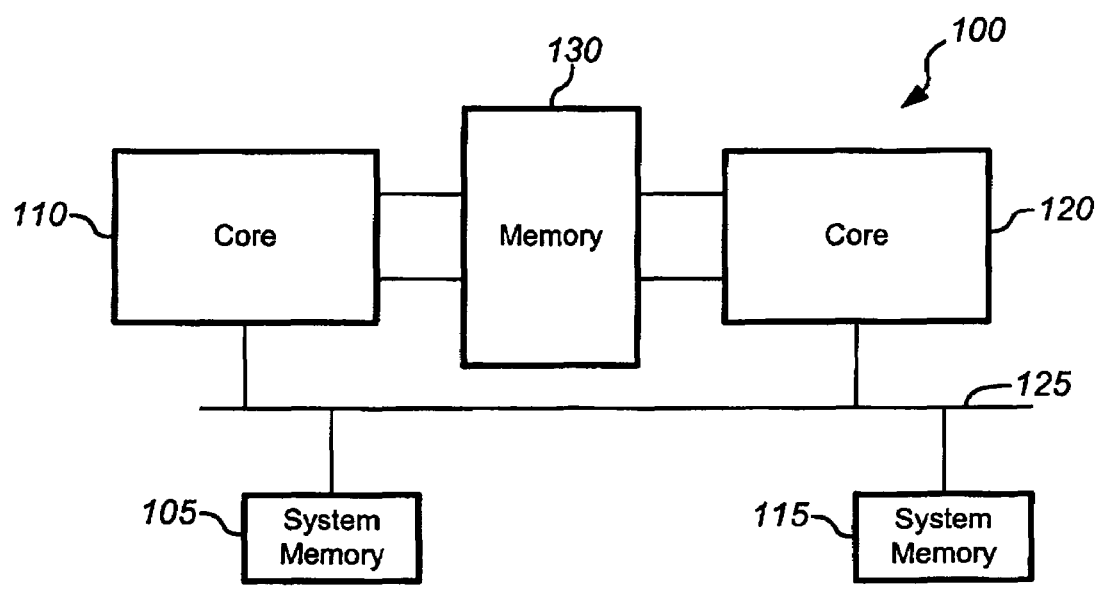
FIG. 2 is a simplified high level block diagram of a multicore system, in accordance with one embodiment of the present invention.

In accordance with one embodiment of the present invention, two or more cores of a multi-core system are configured to share the same instruction cache and/or data cache. FIG. 2 is a simplified high-level block diagram of a multi-core system 100, in accordance with one exemplary embodiment of the present invention. System 100 is shown as including a pair of cores (processing units) 110, 120, a shared memory 130 tightly coupled to cores 110, 120, and a pair of system memories 105 and 115 that are accessible to cores 110 and 120 via system bus 125. Unlike shared memory 130 which is only directly accessible to cores 110 and 120, system memories 105 and 115 are accessible to other components (not shown) via bus 125. The exemplary embodiment 100 of the multi-core system of the present invention is shown as having two cores 110, 120 and one shared memory 130 tightly coupled to these cores. It is understood that a multi-bore system, in accordance with the present invention, may have more than two cores, and may have more than one shared memory coupled to such cores.

In one embodiment, memory 130 may be a cache memory. In another embodiment, memory 130 may include a number of separate and distinct physical or logical memory units, one or more of which may store instructions, and one or more of which may store data.

Each of cores 110 and 120 may be configured to perform a different function while using overlapping instruction sets stored in memory 130. For example, core 110 may be used to control a servo system, and core 120 may be used to control the policies that system 100 is adapted to perform. Because memory 130 stores instruction sets that are common to and executed by both cores 110 and 120, memory 130 is used efficiently. Moreover, shared memory 130 enables cores 110, and 120 to share data, which is advantageous in a number of applications, such as those related to processing of video data.

In some embodiments, shared memory 130 is dynamically partitioned to provide an optimum storage space for cores 110 and 120. In such embodiments, both cores 110 and 120 have access to respective portions of memory 130. Therefore, in such embodiments, access to any particular storage space of shared memory 130 is restricted to only one of the cores during any time period. For example, during one time period, memory 130 may be dynamically divided equally between cores 110 and 120 with each core having access to ½ of memory 130. During another time period, the storage allocation is dynamically modified so that, for example, ¾ of the storage space of memory 130 is allocated to core 110, and the remaining ¼ to core 120, thus providing flexibility. Dynamic allocation of shared memory 130 between cores 110 and 120 may be carried out using a control software.

Figure 3:
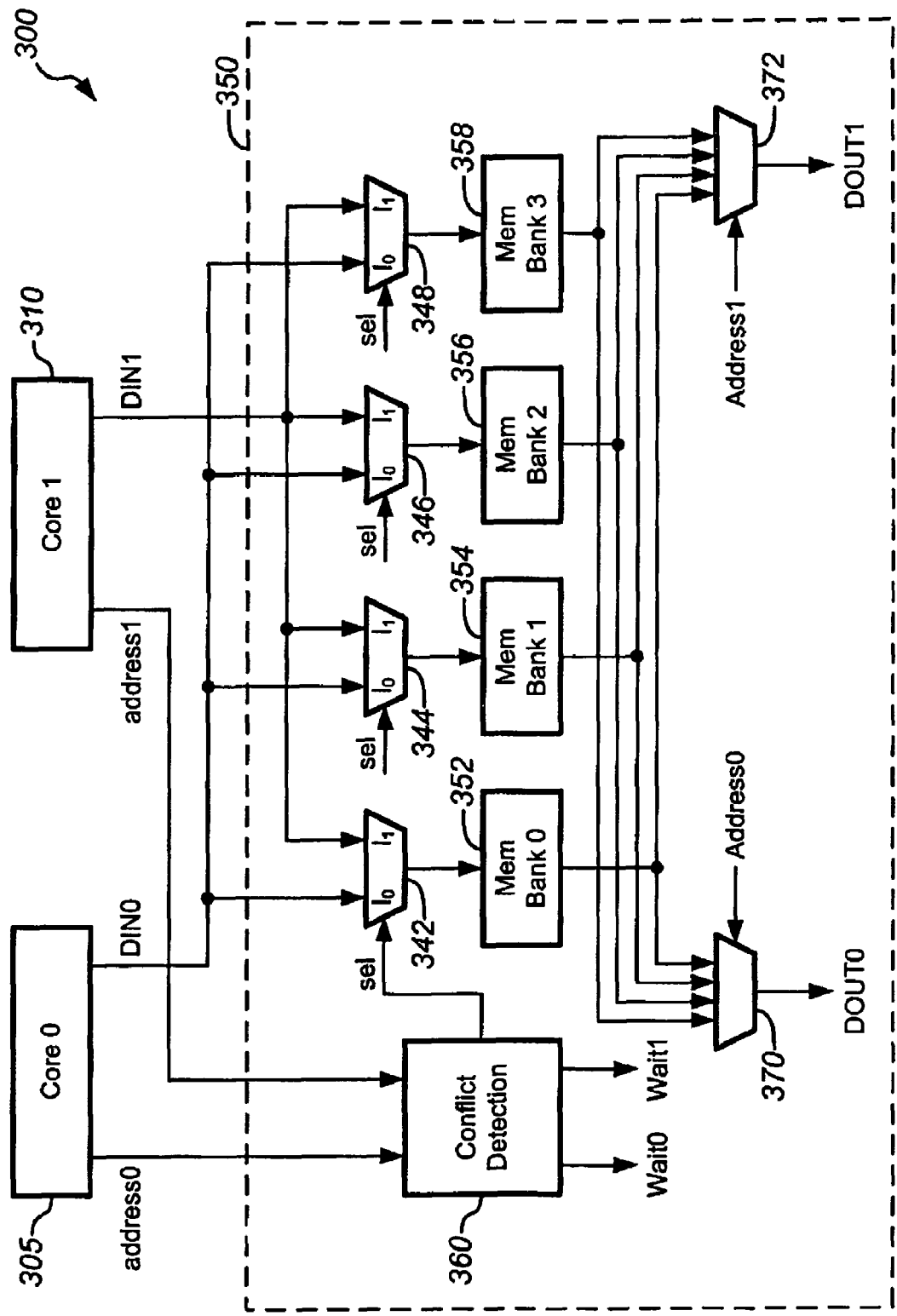
FIG. 3 is more detailed block diagram of a multicore system, in accordance with one embodiment of the present invention.

The following description is provided with reference to another exemplary embodiment 300 of a two-core system, shown in FIG. 3, in which a tightly coupled memory (TCM) 350 is partitioned into four banks 352, 354, 356, and 358, shared by and accessible to two cores, namely cores 305 and 310. It is understood, however, that a multi-core system in accordance with the present invention may have more than 2 cores, and that TCM 350 may be partitioned into more or fewer than 4 banks. It is also understood that more than one TCM may be shared by a multi-core system of the present invention, each of which TCMs may be partitioned into a multitude of banks. One or more of such shared TCMs may be used to store instructions, and the remaining of such shared TCMs may be used to store data. It is further understood that each bank of each TCM may be a single port, dual port or a multi-port memory.

Referring to exemplary embodiment 300 shown in FIG. 3, each of banks 352, 354, 356, and 358 is a 32-bit wide memory. Each of the memory banks has an associated input multiplexer. Bank 352 is associated with multiplexer (mux) 342; bank 354 is associated with mux 344; bank 356 is associated with mux 346; and bank 358 is associated with mux 348. Core 305 is shown as supplying data DIN0 to a first data input terminal $I_0$ of each of muxes 342, 344, 346 and 348. Core 310 is shown as supplying data DIN1 to a second data input terminal $I_1$ of each of muxes 342, 344, 346 and 348. In response to a first logic state of select signal Sel, muxes 342, 344, 346, and 348 deliver data DIN0 to their associated memory banks. In response to a second logic state of select signal Sel, muxes 342, 344, 346, and 348 deliver data DIN1 to their associated memory banks.

Signal Sel is generated by conflict detection block 360 in response to address bits A[3:2], shown as signals address1 and address0 provided by cores 310 and 305, respectively. In this exemplary embodiment, if these two bits have a decimal value of 0 (A[3:0] hex 0), bank 352 is selected by conflict detection block 360; if they have a decimal value of 1 (A[3:0] hex 4), bank 354 is selected by conflict detection block 360; if they have a decimal value of 2 (A[3:0] hex 8), bank 356 is selected by conflict detection block 360; and if they have a decimal value of 3 (A[3:0] hex C), bank 358 is selected by conflict detection block 360. To avoid conflicts, when access to any one of the banks is granted to one of the cores, a wait signal is generated to indicate to the other core that the accessed bank is unavailable, as described further below.

Assume that during a given cycle, core 305 is seeking access, for either a read, write, or any other memory operation, to address 0×3000 (Hex), and core 310 is seeking access to address 0×4000. Because bits [3:2] of the addresses supplied by both cores is pointing to the same bank 352, a conflict exists. Assume that in accordance with any one of a number of known arbitration schemes, e.g., round robin, access priority is given to core 305 during cycle T1. Accordingly, to ensure that core 310 does not access bank 352 during this period, wait signal Wait1 is asserted to put core 310 on hold and to inhibit core 310 from accessing bank 352. During the next cycle T1+1, when core 310 accesses bank 352, core 305 accesses, for example, bank 354. During the next cycle T1+2, when core 310 accesses bank 354, core 305 accesses, for example, bank 356. Similarly, during the next cycle T1+3, when core 310 accesses bank 356, core 305 accesses, for example, bank 358. In other words, in some exemplary embodiments, cores 305 and 310 write data to and read data from across banks 352, 354, 356 and 358 sequentially. A multi-bit register may be used in conflict detection block 360 to control the manner in which access to various banks and regions within each bank is granted or denied and further to control the assertion and deassertion of the wait signals Wait0 and Wait1.

Memory 350 is also shown as having a pair of output muxes 370, and 372. The data retrieved from banks 352, 354, 356, and 358 are delivered to each of output muxes 370 and 372. Mux 370 delivers the data it receives from one of the 4 banks to core 305 in response to the address signal address0 received from core 305. Mux 372 delivers the data it receives from one of the 4 banks to core 310 in response to the address signal address1 received from core 310.

Figure 4A:
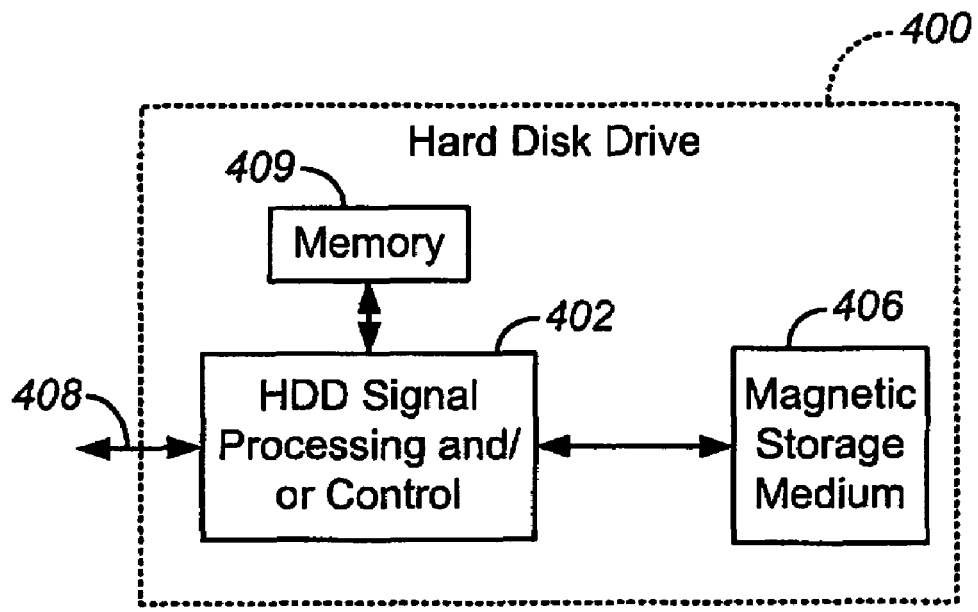
FIGS. 4A-4H show various devices in which the present invention may be embodied.

Referring now to FIGS. 4A-4G, various exemplary implementations of the present invention are shown. Referring to FIG. 4A, the present invention may be embodied in a hard disk drive 400. The present invention may implement either or both signal processing and/or control circuits, which are generally identified in FIG. 4A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408. HDD 400 may be connected to memory 409, such as random access memory (RAM), a low latency nonvolatile memory such as flash memory, read only memory (ROM) and/or other suitable electronic data storage.

Figure 4B:
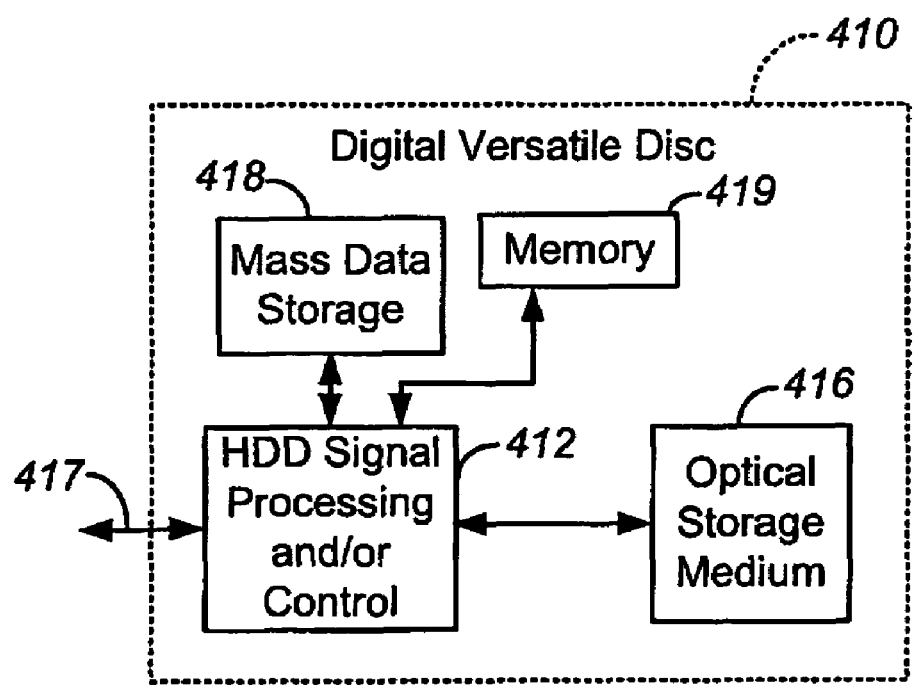

Referring now to FIG. 4B, the present invention may be embodied in a digital versatile disc (DVD) drive 410. The present invention may implement either or both signal processing and/or control circuits, which are generally identified in FIG. 4B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown) such as a computer, television or other device via one or more wired or wireless communication links 417. DVD 410 may communicate with mass data storage 418 that stores data in a nonvolatile manner. Mass data storage 418 may include a hard disk drive (HDD) such as that shown in FIG. 4A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

Figure 4C:
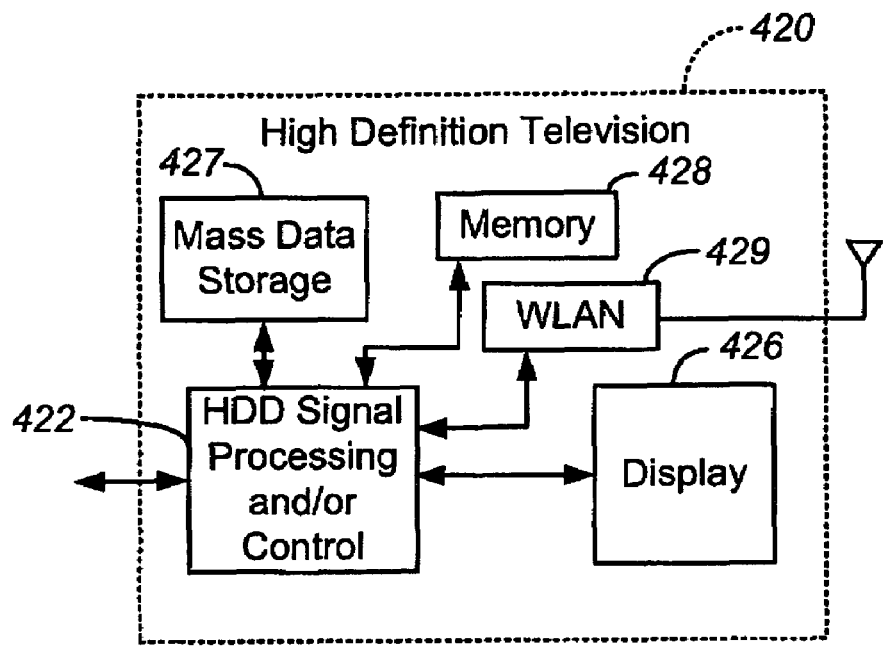

Referring now to FIG. 4C, the present invention may be embodied in a high definition television (HDTV) 420. The present invention may implement either or both signal processing and/or control circuits, which are generally identified in FIG. 4C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 4A and/or at least one DVD may have the configuration shown in FIG. 4B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Figure 4D:
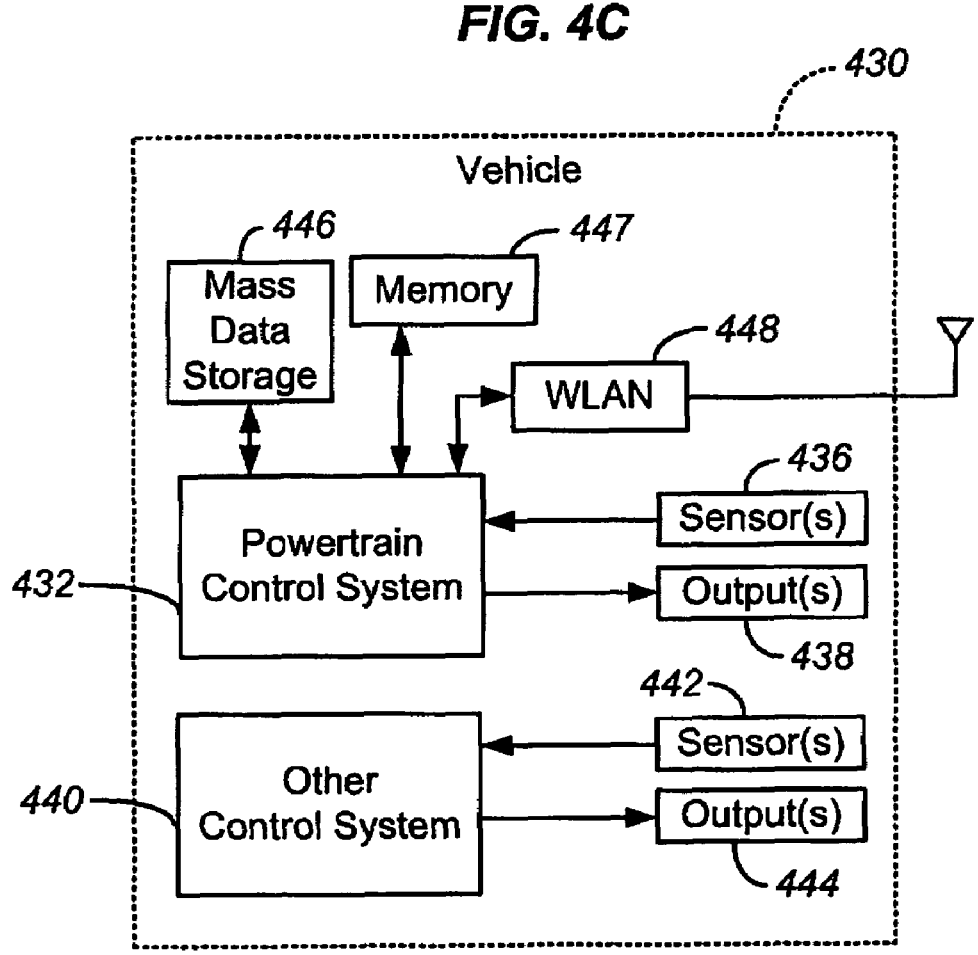

Referring now to FIG. 4D, the present invention implements a control system of a vehicle 430, a WLAN interface and/or mass data storage of the vehicle control system. In some implementations, the present invention implements a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Figure 4E:
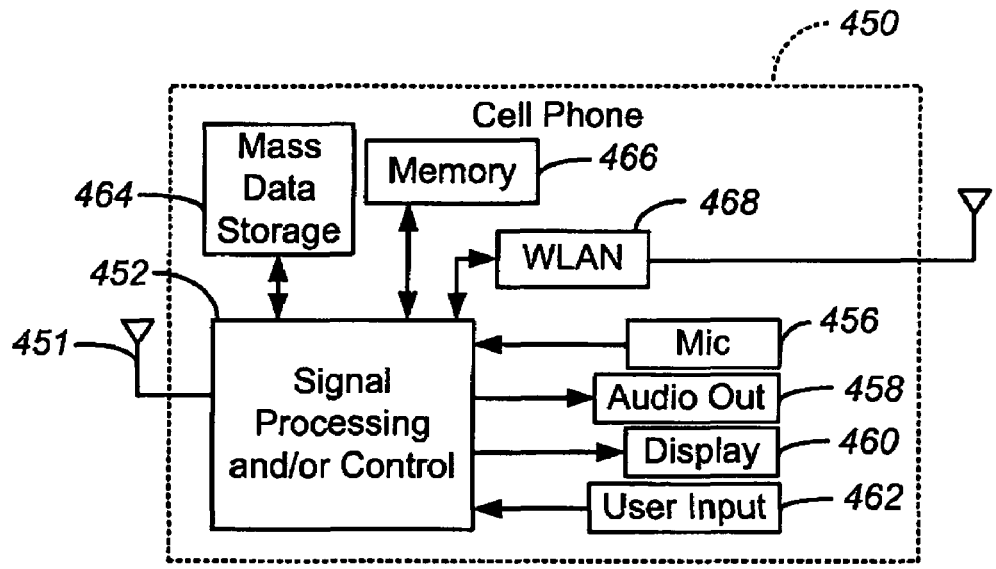

Referring now to FIG. 4E, the present invention may be embodied in a cellular phone 450 that may include a cellular antenna 451. The present invention may implement either or both signal processing and/or control circuits, which are generally identified in FIG. 4E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 4F:
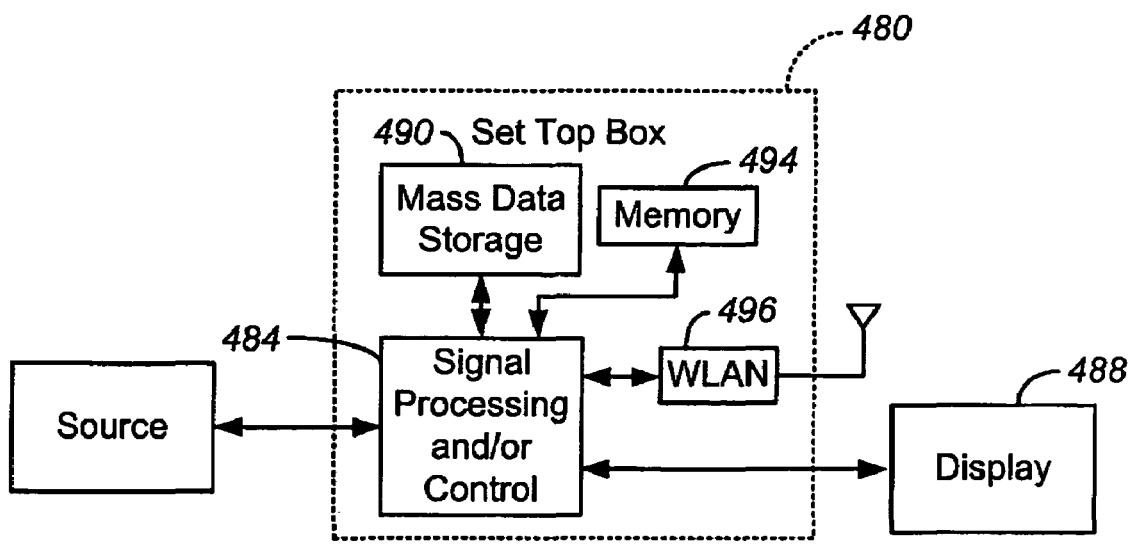

Referring now to FIG. 4F, the present invention may be embodied in a set top box 480. The present invention may implement either or both signal processing and/or control circuits, which are generally identified in FIG. 4F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 4G:
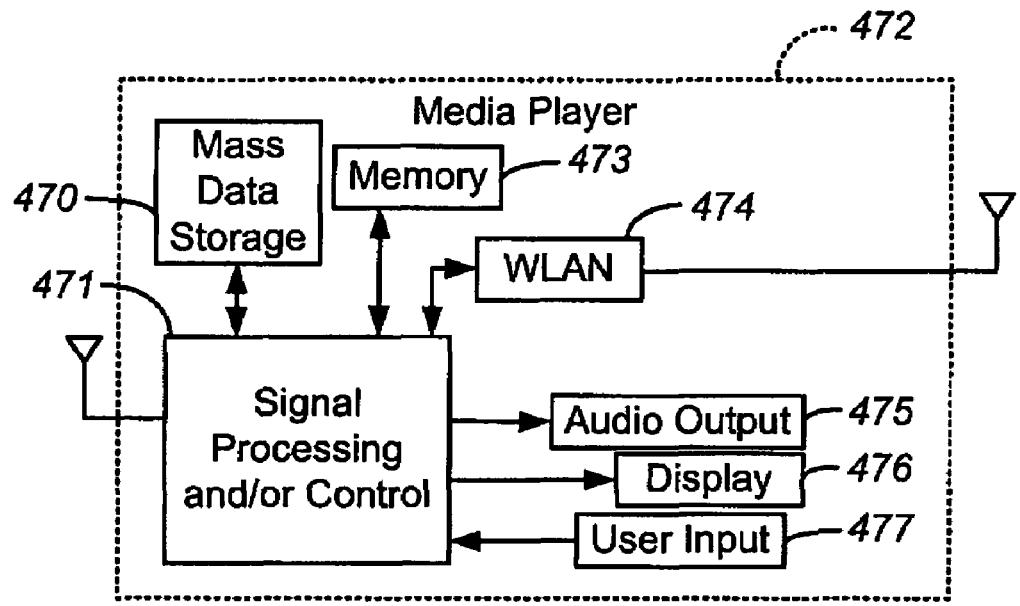

Referring now to FIG. 4G, the present invention may be embodied in a media player 472. The present invention may implement either or both signal processing and/or control circuits, which are generally identified in FIG. 4G at 471, a WLAN interface and/or mass data storage of the media player 472. In some implementations, media player 472 includes a display 476 and/or a user input 477 such as a keypad, touchpad and the like. In some implementations, media player 472 may employ a graphical user interface (GUI) that typically employs menus, drop down menus, icons and/or a point-and-click interface via display 476 and/or user input 477. Media player 472 further includes an audio output 475 such as a speaker and/or audio output jack. Signal processing and/or control circuits 471 and/or other circuits (not shown) of media player 472 may process data, perform coding and/or encryption, perform calculations, format data and/or perform any other media player function.

Media player 472 may communicate with mass data storage 470 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Media player 472 may be connected to memory 473 such as RAM, ROM, low latency nonvolatile memory such as flash memory and/or other suitable electronic data storage. Media player 472 also may support connections with a WLAN via a WLAN network interface 474.

Figure 4H:
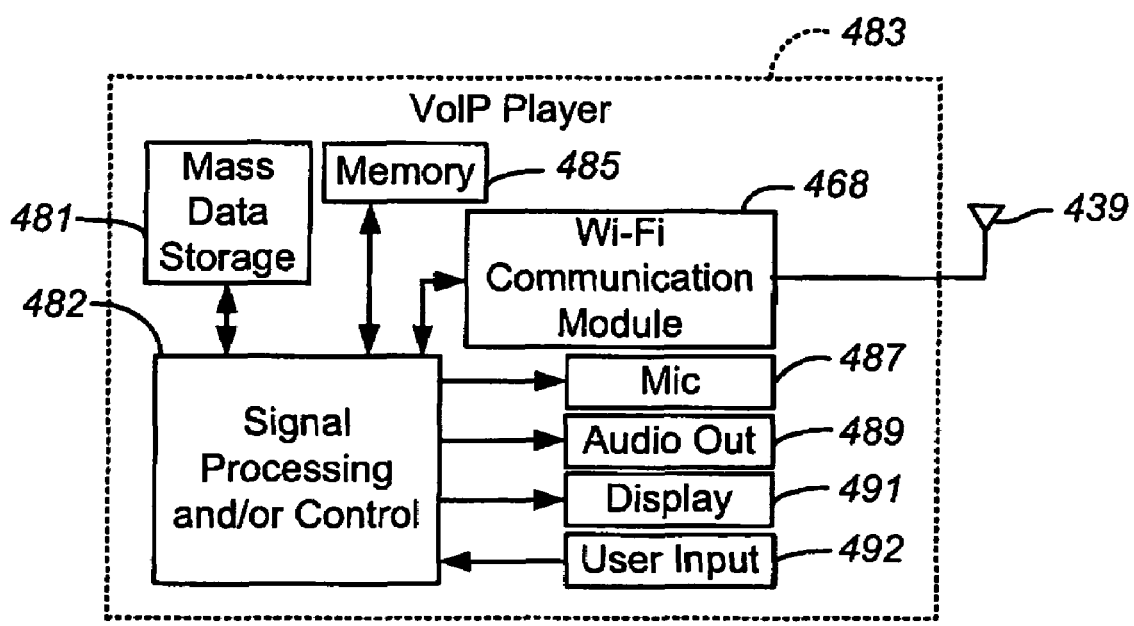

Referring to FIG. 4H, the present invention may be embodied in a Voice over Internet Protocol (VoIP) phone 483 that may include an antenna 439. The present invention may implement either or both signal processing and/or control circuits, which are generally identified in FIG. 4H at 482, a wireless interface and/or mass data storage of the VoIP phone 483. In some implementations, VoIP phone 483 includes, in part, a microphone 487, an audio output 489 such as a speaker and/or audio output jack, a display monitor 491, an input device 492 such as a keypad, pointing device, voice actuation and/or other input devices, and a Wireless Fidelity (Wi-Fi) communication module 486. Signal processing and/or control circuits 482 and/or other circuits (not shown) in VoIP phone 483 may process data, perform coding and/or encryption, perform calculations, format data and/or perform other VoIP phone functions.

VoIP phone 483 may communicate with mass data storage 502 that stores data in a nonvolatile manner such as optical and/or magnetic storage devices, for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". VoIP phone 483 may be connected to memory 485, which may be a RAM, ROM, low latency nonvolatile memory such as flash memory and/or other suitable electronic data storage. VoIP phone 483 is configured to establish communications link with a VoIP network (not shown) via Wi-Fi communication module 486. Still other implementations in addition to those described above are contemplated.

The above embodiments of the present invention are illustrative and not limiting. Various alternatives and equivalents are possible. The invention is not limited by the number of cores, nor is it limited by the number of shared memories tightly coupled to the cores. The invention is not limited by the number of banks in each shared memory. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure.

What is claimed is:

1. An electronic device comprising:
   a plurality of processing units each in direct communication with a bus;
   at least one system memory in direct communication with the bus; and
   at least one shared memory directly accessible to said plurality of processing units, said at least one shared memory not being in direct communication with the bus, wherein said at least one shared memory comprises a plurality of storage spaces, wherein a first subset of said plurality of storage spaces is configured to store data and a second subset of said plurality of storage spaces is configured to store instructions.

2. The electronic device of claim 1 wherein said at least one shared memory is a cache memory.

3. The electronic device of claim 1 wherein each of said plurality of storage spaces is a bank accessible directly by each of the plurality of processing units.

4. The electronic device of claim 3 wherein each of said plurality of banks of the at least one shared memory has a same storage space.

5. The electronic device of claim 4 wherein a number of said plurality of banks is greater than a number of the plurality of processing units.

6. The electronic device of claim 3 wherein each of said plurality of banks is a dual port bank.

7. The electronic device of claim 3 further comprising:
   a first plurality of multiplexers each associated with a different one of the plurality of banks and each configured to receive data from each of the plurality of processing units during a clock cycle and to supply data from one of the plurality of processing units to a bank associated therewith.

8. The electronic device of claim 7 further comprising:
a second plurality of multiplexers each configured to receive data from each of the plurality of banks during the clock cycle and to supply data from one of the plurality of banks as an output data.

9. The electronic device of claim 3 further comprising:
a conflict detection block configured to resolve access conflicts to each of the plurality of the banks in accordance with a number of address bits and further in accordance with a predefined arbitration scheme.

10. The electronic device of claim 9 wherein said conflict detection block is further configured to provide each of the plurality of processing units with sequential access to the plurality of the banks during consecutive cycles of a clock signal and in accordance with the predefined arbitration scheme.

11. The electronic device of claim 10 wherein said arbitration scheme is selected from a group consisting of round robin, least-frequent-requested, pseudo-random, and non-starvation priority arbitration schemes.

12. The electronic device of claim 1 wherein said plurality of storage spaces is allocated among said plurality of processing units during a first time period.

13. The electronic device of claim 12 wherein said allocation of said plurality of storage spaces among said plurality of processing units is different during a second time period.

14. A memory management method for at least one shared memory that is partitioned into a plurality of storage spaces, the method comprising:
using a bus to transfer data directly between at least one system memory and a plurality of processing units;
sharing the at least one shared memory between said plurality of processing units, said at least one shared memory not being in direct communication with the bus;
transferring data between each of said plurality of processing units and each of a first subset of said plurality of storage spaces; and
transferring instructions between each of said plurality of processing units and each of a second subset of said plurality of storage spaces.

15. The method of claim 14 wherein said at least one shared memory is a cache memory.

16. The method of claim 14 wherein each of said plurality of storage spaces is a bank.

17. The method of claim 16 wherein each of said plurality of banks of said at least one shared memory has a same storage space.

18. The method of claim 17 wherein a number of said plurality of banks is greater than a number of said plurality of processing units.

19. The method of claim 16 wherein each of said plurality of banks is a dual port bank.

20. The method of claim 16 further comprising:
selectively transferring data during a clock cycle from each of said plurality of processing units to said plurality of banks.

21. The method of claim 20 further comprising:
selectively retrieving data during the clock cycle from each of said plurality of banks.

22. The method of claim 16 further comprising:
resolving conflicts in accessing said plurality of banks in accordance with a number of address bits and further in accordance with a predefined arbitration scheme.

23. The method of claim 22 further comprising:
providing each of said plurality of processing units with sequential access to said plurality of banks during consecutive cycles of a clock signal and in accordance with said predefined arbitration scheme.

24. The method of claim 23 wherein said arbitration scheme is selected from a group consisting of round robin, least-frequent-requested, pseudo-random, and non-starvation priority arbitration schemes.

25. The method of claim 14 further comprising allocating said plurality of storage spaces of said at least one shared memory among said plurality of processing units during a first time period.

26. The method of claim 25 wherein said allocation of said plurality of storage spaces among said plurality of processing units is different during a second time period.

* * * * *